United States Patent Office 3,850,929
Patented Nov. 26, 1974

3,850,929
(1,2,5)THIADIAZOLO[3,4-b]PYRAZINES
Yulan C. Tong, Walnut Creek, Calif., assignor to The Dow Chemical Company, Midland, Mich.
No Drawing. Filed Mar. 19, 1973, Ser. No. 342,517
Int. Cl. C07d 51/76
U.S. Cl. 260—250 BC
9 Claims

ABSTRACT OF THE DISCLOSURE (1,2,5)Thiadiazolo(3,4-b)pyrazines of the formula

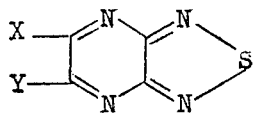

wherein the 5,6-positions can be hydrogen, cyan, halo, amino, lower alkylthio or lower alkoxy substituted. The compounds are prepared by reacting a 2,3-diaminopyrazine with thionyl chloride and recovering the reaction product. The compounds have antimicrobial activity.

BACKGROUND OF THE INVENTION

The (1,2,5)-thiadiazolo(3,4-b)pyridines are known; L. A. Zolotova et al., Tr. Leningrad. Khim. Farm. Inst. 1969, No. 28, 189–191; and G. H. Harts et al., Recueil, 89, 5 (1970). Their antimicrobial activity is poor.

SUMMARY OF THE INVENTION

This invention concerns (1,2,5)thiadiazolo(3,4-b)pyrazines corresponding to the formula

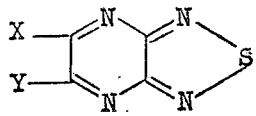

wherein X and Y independently represent chloro, bromo, lower alkoxy, mono- and di-lower alkylamino, lower alkylthio, NC— or H; wherein when X or Y is lower alkylthio, NC— or H, the other Y or X is the same; and wherein when X or Y is lower alkoxy, the other Y or X is not mono- or di-lower alkylamino. In the specification and claims, the terms "lower alkyl" and "lower alkoxy" designates, respectively, 1, to 2, to 3, to 4 carbon atom straight or branched-chain alkyl groups such as, for example, methyl, ethyl, propyl, isopropyl, n-butyl, isobutyl, sec-butyl or tert-butyl and the corresponding alkoxy groups. Hereinafter, such compounds will be referred to as "Compound," "the Compound," or "the Compounds."

The Compounds are prepared by mixing substantially one molar proportion of 2,3-diaminopyrazine or a suitably substituted 2,3-diaminopyrazine with substantially two molar proportions of thionyl chloride in the presence of an inert organic solvent, advantageously a hydrocarbon or a halogenated hydrocarbon solvent. A small amount of an acid acceptor such as pyridine or triethylamine may be used if desired. The reaction is advantageously carried out at reflux temperature and may be monitored by following the evolution of hydrogen chloride or the formation of amine hydrochloride. Upon completion of the reaction, the reaction mixture is concentrated under reduced pressure and recovered by extraction with an organic solvent or by evaporating to dryness, washing to remove byproduct or excess of a reactant and crystallizing or distilling and crystallizing or subliming if a purified product is desired.

DESCRIPTION OF SOME PREFERRED EMBODIMENTS

The following examples further describe the invention and the manner and process of making and using it so as to enable the art-skilled to make and use the invention, and set forth the best mode contemplated by the inventor of carrying out the invention.

Example 1: Preparation of (1,2,5)thiadiazolo(3,4-b)pyrazine

In a reaction flask mix 11.0 g. (0.1 mol.) of 2,3-diaminopyrazine, 23.8 g. (0.22 mol.) of thionyl chloride and 100 ml. of xylene. The whole is heated to boiling under reflux for 8 hours. After cooling, the reaction mixture is concentrated under reduced pressure and the residue extracted with benzene. The benzene solution is decolorized with silica gel and evaporated to dryness to yield 4.2 g. (30%) of product, m.p. 162–165° C.
Anal.—Calcd. for $C_4H_2N_4S$: C, 34.78; H, 1.46; N, 40.56. Found: C, 34.8; H, 1.8; N, 40.7.

Example 2: Preparation of 5,6-dichloro-(1,2,4)thiadiazolo(3,4-b)pyrazine

In 150 ml. of xylene mix 17.9 g. (0.1 mol.) of 2,3-diamino-5,6-dichloropyrazine and 1 ml. of pyridine. To this mixture add slowly with stirring 26.2 g. (0.22 mol.) of thionyl chloride. The whole is heated to boiling under reflux for 7 hours. The mixture is evaporated to dryness under reduced pressure, washed with hexane and filtered. The solid is decolorized with silica gel and recrystallized from carbon tetrachloride-benzene mixture to give a total of 15.2 g. (73.5%) of product, m.p. 180–182° C.
Anal.—Calcd. for $C_4Cl_2N_4S$: C, 23.2; H, 0.0; N, 27.1. Found: C, 23.0; H, 0.4; N, 26.8.

Example 3: Preparation of 5,6-dibromo-(1,2,5)thiadiazolo-(3,4-b)pyrazine

A mixture of 15.0 g. (0.0725 mol.) of 5,6-dichloro (1,2,5)thiadiazolo(3,4-b)pyrazine and 17.4 g. (0.112 mol.) of bromine in 250 ml. of chloroform is heated to boiling under reflux for 80 hours. The solvent is removed under reduced pressure and the residue washed with carbon tetrachloride and dried. IR-spectrum indicates the (1,2,5)-thiadiazolo(3,4-b)pyrazine ring system. Mass spectrum indicates a mixture of 5,6-dibromo (1,2,5)thiadiazolo(3,4-b)pyrazine and 5-bromo-6-chloro (1,2,5)thiadiazolo(3,4-b)pyrazine. M.p. 155° C. (dec.).
Anal.—Calcd. for $C_4BrClN_4S$: C, 19.10; Br, 31.77; Cl, 14.10; N, 22.28; S, 12.75. $C_4Br_2N_4S$: C, 16.20; Br, 53.9; N, 18.9; S, 10.8. Found: C, 17.3; Br, 48.3; N, 20.2; S, 11.7. The mixed product is separated into its components by chromatographic methods.

Example 4: Preparation of 5-chloro-6-(dipropylamino)-(1,2,5)thiadiazolo(3,4-b)pyrazine In 25 ml. of toluene mix 4.15 g. (20 mmol.) of 5,6-dichloro-(1,2,5)thiadiazolo(3,4-b)pyrazine, 2.22 g. (22 mmol.) of di-n-propylamine, and 2.22 g. (22 mmol.) of triethylamine. The whole is heated to boiling under reflux for 4 hours, cooled and filtered to remove triethylamine hydrochloride. The filtrate is concentrated and distilled. The distillate solidifies on standing and is crystalized from hexane to give 3.4 g. (66%) of product, m.p. 63–64° C.
Anal.—Calcd. for $C_{10}H_{14}ClN_5S$: C, 44.2; H, 5.2; N, 25.8. Found: C, 44.4; H, 5.1; N, 25.7.

Example 5: Preparation of 5,6-bis-(dipropylamino)-(1,2,5)-thiadiazolo(3,4-b)pyrazine In 75 ml. of toluene mix 10.4 g. (0.05 mol.) of 5,6-dichloro-(1,2,5)thiadiazolo(3,4-b)pyrazine, 11.1 g. (0.11 mol.) of dipropylamine and 11.1 g. (0.11 mol.) of triethylamine. The reaction mixture is heated to boiling under reflux for 6 hours, and filtered to remove triethylamine hydrochloride. The filtrate is evaporated to dryness to give a black oil. The black oil is quickly distilled to a red oil, which solidifies. It is recrystallized from hexane to give 8.6 g. (51%) of product, m.p. 54–56° C.

Anal.—Calcd. for $C_{16}H_{28}N_6S$: C, 57.11; H, 8.39; N, 24.97. Found: C, 57.1; H, 7.9; N, 24.95.

Example 6: Preparation of 5-chloro-6-methoxy-(1,2,5)-thiadiazolo(3,4-b)pyrazine

A mixture of 4.15 g. (0.02 mol') of 5,6-dichloro-(1,2,5) thiadiazolo(3,4-b)pyrazine, 1.43 g. (0.022 mol.) of methanol and 2.22 g. (0.022 mol.) of triethylamine in 25 ml. of toluene is heated to boiling under reflux for 8 hours. After cooling, the amine salt is filtered off and the filtrate concentrated. The residue is recrystallized from benzene-hexane to give 2.5 g. of material. Mass-spectrum indicates a mixture of mono- and di-methoxy-substituted compound, m.p. 101–107° C.

microbials for the control of bacteria, fungi and yeasts. For such uses, the compounds can be employed in an unmodified form or dispersed on a finely divided solid and employed as dusts. Such mixtures can also be dispersed in water with the aid of a surface active agent and the resulting aqueous suspensions employed as sprays. In other procedures, the products can be employed as active constituents in solvent solutions or oil-in-water emulsions or dispersions. The augmented compositions are adapted to be formulated as concentrates and subsequently diluted with additional liquid or solid adjuvants to produce the ultimate treating compositions. Good results are obtained when employing compositions containing antimicrobial concentrations and usually from about 100 to 10,000 parts by weight of one or more of the compounds per million parts of such composition.

In representative operations, compounds of the present invention were tested for their activity as antimicrobials using conventional agar dilution tests. The following Table presents results, expressed as concentration of toxicant in parts per million to achieve 100% growth inhibition (kills) of the indicated organisms.

TABLE 1.—SUMMARY OF ANTIMICROBIAL ACTIVITY

Compounds

| X | Y | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|----|----|----|----|----|----|----|----|
| | | Minimum concentration, p.p.m. for 100% control | | | | | | | | | | | | | | | | |
| Cl | Cl | 500 | 500 | 500 | 500 | 100 | 500 | 500 | 100 | 500 | 500 | 500 | 500 | 100 | 500 | 500 | 500 | 500 |
| Br | Br | | 500 | 500 | 500 | 500 | 500 | | 500 | 500 | 500 | 500 | 500 | | 500 | 500 | 500 | 500 |
| H | H | 100 | 500 | 100 | 100 | 10 | 100 | 100 | 100 | 100 | 100 | 100 | 100 | 100 | 100 | 100 | 10 | 100 |
| Cl | OCH₃ | | | 500 | 500 | 500 | | 500 | 500 | 500 | 500 | 500 | | 500 | 500 | 500 | 500 | 500 |
| Cl | NPr₂ | | 500 | | 10 | 100 | 100 | | 100 | 100 | 100 | | | 100 | | 500 | 500 | 500 |

*1=P. aeruginosa; 2=S. aureus; 3=E. coli; 4=C. albicans; 5=T. mentagrophytes; 6=B. subtilis; 7=A. aerogenes; 8=A. terreus 9=C. pelliculosa; 10=P. pullulans; 11=S. typhosa; 12=Pseudomonas Sp. strain 10; 13=M. phlei; 14=R. nigricans; 15=Ceratocystis ips 16=Cephaloascus fragans; 17=Trichoderm Sp. Madison P-42.

Anal.—Calcd. for 4 mol:1 mol. mono- and di-substituted mixture: C, 30.96; H, 1.80; N, 27.77. Found: C, 30.7; H, 2.0; N, 27.8. The mixture is separated into its components by chromatographic methods.

Example 7: Preparation of 5,6-bis-(propylthio)-(1,2,5)-thiadiazolo(3,4-b)pyrazine In 50 ml. of benzene mix 4.15 g. (0.02 mol.) of 5,6-dichloro-(1,2,5)thiadiazolo(3,4-b)pyrazine and 3.8 g. (0.05 mol.) of propanethiol. The mixture is cooled to 15–20° C. while 5 g. (0.05 mol.) of triethylamine in 20 ml. of benzene is added slowly. The whole is stirred at room temperature for 6 hours. Triethylamine hydrochloride which forms is removed by filtration. The filtate is concentrated and the residue recrystallized from hexane to give 2.7 g. (47%) of product, m.p. 69–70° C.

Anal.—Calcd. for $C_{10}H_{14}N_4S_3$: C, 41.9; H, 4.93; N, 19.56. Found: C, 42.0; H, 4.6; N, 19.8.

The reaction is repeated with 5.2 g. (0.025 mol.) of 5,6-dichloro(1,2,5)-thiadiazolo(3,4-b)pyrazine, 1.9 g. (0.025 mol.) of propanethiol and 2.5 g. (0.025 mol.) of triethylamine in 100 ml. of benzene. The same bis-substituted product is obtained in 29% yield. It is identified by IR and TLC.

Example 8: Preparation of (1,2,5)thiadiazolo(3,4-pyrazine-5,6-dicarbonitrile 2,3-Diamino-pyrazine-5,6-dicarbonitrile, 4.0 g. (0.025 mole) and 11.9 g. (0.11 mole) of thionyl chloride in 250 ml. of xylene are mixed and heated to boiling under reflux for 24 hours. The reaction mixture is cooled and filtered and the filtrate evaporated to dryness to give a dark-brown solid, which is purified by sublimation to give 2.2 g. (47%) of product, m.p. 288–291° C.

Anal.—Calcd. for $C_6N_6S$: C, 38.29; N, 44.66. Found: C, 38.50; N, 44.6.

The compounds of the invention are employed as anti-

Several of the compounds of this invention are useful as herbicides, plant pesticides or plant growth regulating agents. This is not to suggest that all of them are equally effective against the same plants or plant pests or at the same concentrations. Plant growth stunters and herbicides herein are used both in pre-emergent application to the soil or in foliar application to the growing plant. The compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions or oil-in-water emulsions or dispersions. The augmented compositions are adapted to be formulated as concentrates and subsequently diluted with additional liquid or solid adjuvants to produce ultimate treating compositions. Good results are obtained when employing compositions containing from about 10 to about 20 pounds per acre of active material for pre-emergent application and from about 0.5 to about $4 \times 10^3$ parts per million (p.p.m.) of active agent for foliar application.

In the following Table, data are presented showing the activity of compounds, listed by example number, as herbicides and pesticides wherein the active agent is used in conventional pre-emergent and foliar applications.

TABLE II

Herbicidal and pesticidal activity percent control/application rate

| Pre-emergent example | Percent control lb. acre | Foliar example | Percent control p.p.m.×10³ |
|---|---|---|---|
| 5 | Barnyard grass 80/10 | 5 | Bean mildew 100/4. |
| | | 7 | Bindweed 85/4, Pigweeds 50/4, Bean mildew 60/4. |

The 5,6-dicyano compound reduced the plant growth of beans 60% when young plants were sprayed to run off with a spray containing 4000 p.p.m. of that compound.

The method of F. G. McDonald e.a., J. Am. Chem. Soc. 69: 1034 (1947) is useful in preparing the 2.3-diaminopyrazine starting material.

What is claimed is:

1. A compound represented by the formula

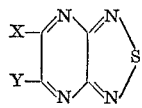

wherein X and Y independently represent chloro. bromo, lower alkoxy, mono- or di-lower alkylamino, lower alkylthio, NC— or H; wherein when X or Y is lower alkylthio, NC— or H, the other Y or X is the same; and wherein when X or Y is lower alkoxy, the other Y or X is not mono- di-lower alkylamino.

2. The compound of Claim 1 which is (1,2,5)thiodiazolo(3,4-b)pyrazine.

3. The compound of Claim 1 which is 5,6-dichloro-(1,2,5)thiadiazolo(3,4-b)pyrazine.

4. The compound of Claim 1 which is 5,6-dibromo-(1,2,5)thiadiazolo(3,4-b)pyrazine.

5. The compound of Claim 1 which is 5-chloro-6-(dipropylamino)-(1,2,5)thiadiazolo(3,4-b)pyrazine.

6. The compound of Claim 1 which is 5,6-bis-(dipropylamino)-(1,2,5)thiadiazolo(3,4-b)pyrazine.

7. The compound of Claim 1 which is 5-chloro-6-methoxy(1,2,5)thiadiazolo(3,4-b)pyrazine.

8. The compound of Claim 1 which is 5,6-bis-(propylthio)-(1,2,5)thiadiazolo(3,4-b)pyrazine.

9. The compound of Claim 1 which is (1,2,5)thiadiazolo(3,4-b)pyrazine-5,6-dicarbonitrile.

References Cited

Gasco et al.: J. Heterocyclic Chem. 1969, 6(5), 769–70, Chemical Abstracts 72: 34646 (1970).

NICHOLAS S. RIZZO, Primary Examiner

R. D. McCLOUD, Assistant Examiner

U.S. Cl. X.R.

71—76, 90; 424—250